United States Patent
Martone et al.

(10) Patent No.: US 10,101,436 B2
(45) Date of Patent: Oct. 16, 2018

(54) METHOD AND APPARATUS FOR BANDWIDTH SELECTION FOR RADAR TRANSMISSION

(71) Applicant: U.S. Army Research Laboratory ATTN: RDRL-LOC-1, Washington, DC (US)

(72) Inventors: Anthony F. Martone, Ellicott City, MD (US); Kenneth I. Ranney, Rockville, MD (US); Traian V. Dogaru, Ellicott City, MD (US); Kelly D. Sherbondy, Burke, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 557 days.

(21) Appl. No.: 14/822,949

(22) Filed: Aug. 11, 2015

(65) Prior Publication Data
US 2018/0074165 A1    Mar. 15, 2018

Related U.S. Application Data

(60) Provisional application No. 62/073,053, filed on Oct. 31, 2014.

(51) Int. Cl.
| | | |
|---|---|---|
| G01S 13/534 | (2006.01) | |
| G01S 7/02 | (2006.01) | |
| H04W 16/14 | (2009.01) | |
| H04L 5/00 | (2006.01) | |

(52) U.S. Cl.
CPC ............ *G01S 7/023* (2013.01); *H04W 16/14* (2013.01); *H04L 5/0062* (2013.01)

(58) Field of Classification Search
CPC ..................................................... G01S 7/023
USPC ................................................... 342/159–164
See application file for complete search history.

(56) References Cited

U.S. PATENT DOCUMENTS

| | | | |
|---|---|---|---|
| 3,720,949 A | | 3/1973 | Richter |
| 4,901,082 A | * | 2/1990 | Schreiber .................. G01S 7/28 342/162 |
| 5,017,921 A | * | 5/1991 | McGill ..................... G01S 7/023 342/159 |
| 5,309,160 A | | 5/1994 | Power et al. |
| 5,708,436 A | * | 1/1998 | Loiz ......................... G01S 13/86 342/161 |

(Continued)

OTHER PUBLICATIONS

U.S. Appl. No. 14/010,580, filed Aug. 27, 2013, titled "Method and Apparatus for Cognitive Nonlinear Radar".

(Continued)

Primary Examiner — Marcus E Windrich
(74) Attorney, Agent, or Firm — Alan I. Kalb

(57) ABSTRACT

A method for optimizing bandwidth selection of a radar transmission in a frequency bandwidth in which the frequency bandwidth is divided into a plurality of sub-bands having a plurality of different bandwidths. The energy level is measured for each sub-band and a range resolution is also determined for each sub-band. Thereafter, a sub-band is selected in the frequency range where the signal to interference plus noise ratio plus the range resolution is maximum. Thereafter, a radar transmission is transmitted in the selected sub-band with a bandwidth corresponding to the bandwidth of the selected sub-band.

6 Claims, 3 Drawing Sheets

(56) References Cited

U.S. PATENT DOCUMENTS

| | | | | |
|---|---|---|---|---|
| 6,888,491 | B2* | 5/2005 | Richter | G01S 7/023 342/129 |
| 7,450,056 | B2* | 11/2008 | Shirakawa | G01S 7/023 342/159 |
| 7,535,410 | B2* | 5/2009 | Suzuki | G01S 7/2813 342/159 |
| 7,538,720 | B2* | 5/2009 | Pillai | G01S 7/282 342/159 |
| 7,683,827 | B2* | 3/2010 | Kelly, Jr. | G01S 7/021 342/159 |
| 8,502,731 | B2 | 8/2013 | Martone et al. | |
| 8,761,682 | B2* | 6/2014 | Chin | H04B 7/0695 342/159 |
| 2008/0057869 | A1* | 3/2008 | Strong | H04L 27/2608 455/63.1 |
| 2010/0226269 | A1* | 9/2010 | Chakraborty | H04L 5/0007 370/252 |
| 2015/0201420 | A1 | 7/2015 | Martone et al. | |
| 2016/0197686 | A1* | 7/2016 | Rozmaryn | H04B 17/21 370/252 |

OTHER PUBLICATIONS

V.C. Vannicola, J.A. Mineo, "Applications of Knowledge Based Systems to Surveillance," Proceedings of the IEEE National Radar Conference, Apr. 1988, pp. 157-164.

W. Baldygo, R. Brown, M. Wicks, P. Antonik, G. Capraro, L. Hennington, "Artificial Intelligence Applications to Constant False Alarm Rate (CFAR) Processing," Record of the 1993 IEEE National Radar Conference, 1993, pp. 275-280.

W. Melvin, M. Wicks, P. Antonik, Y. Salama, L. Ping, H. Schuman, "Knowledge-Based Space-Time Adaptive Processing for Airborne Early Warning Radar," IEEE Aerospace and Electronic Systems Magazine, vol. 13, No. 4, Apr. 1998, pp. 37-42.

S. Haykin, "Radar Vision," Record of the 1990 IEEE International Radar Conference, May 7-10, 1990, pp. 585-588.

S. Haykin, "Cognitive Dynamic Systems: Radar, Control and Radio," Proceedings of the IEEE, vol. 100, No. 7, Jul. 2012, pp. 2095-2103.

S. Haykin, X. Yanbo, P. Setoodeh, "Cognitive Radar: Step Toward Bridging the Gap Between Neuroscience and Engineering," Proceedings of the IEEE, vol. 100, No. 11, Nov. 2012, pp. 3102-3103.

M.R. Bell, "Information Theory and Radar Waveform Design," IEEE Transactions on Information Technology, vol. 39, No. 5, Sep. 1993, pp. 1578-1597.

N. Goodman, P. Venkata, M. Neifeld, "Adaptive Waveform Design and Sequential Hypothesis Testing for Target Recognition with Active Sensors," IEEE Journal of Selected Topics in Signal Processing, vol. 1, No. 1, Jun. 2007, pp. 105-113.

J.H.H.Chalk, "The Optimum Pulse-Shape for Pulse Communication," Journal of the Institution of Electrical Engineers, 1950, vol. 5, May 1950, pp. 132.

M. Conn, F. Koenig, G. Goldman, E. Adler, "Waveform Generation and Signal Processing for a Multifunction Radar System," Radar Conference, 2004. Proceedings of the IEEE, pp. 161, 165, Apr. 26-29, 2004.

Bhat, S. S.; Narayanan, R.M.; Rangaswamy, M., "Bandwidth Sharing and Scheduling for Multimodal Radar with Communications and Tracking," 2012 IEEE 7th Sensor Array and Multichannel Signal Processing Workshop (SAM), pp. 233, 236, Jun. 17-20, 2012.

Gogineni, S.; Rangaswamy, M.; Nehori, A., "Multi-modal OFDM Waveform Design," 2013 Radar Conference (RadarCon13), pp. 1,5, Apr. 29, 2013-May 3, 2013.

M. Shinriki, H. Takase, R. Sato and H. Susaki, "Multi-Range Resolution Radar Using Sideband Spectrum Energy," Radar, 2001 CIE International Conference on, Proceedings, pp. 231,235, 2001.

* cited by examiner

METHOD AND APPARATUS FOR BANDWIDTH SELECTION FOR RADAR TRANSMISSION

CROSS REFERENCE TO RELATED APPLICATIONS

This application claims the benefit of U.S. provisional patent application Ser. No. 62/073,053 filed Oct. 31, 2014 which is herein incorporated by reference.

GOVERNMENT INTEREST

The invention described herein may be manufactured, used, and licensed by or for the United States Government.

BACKGROUND OF THE INVENTION

I. Field of the Invention

The present invention relates to a method for bandwidth selection for a radar transmission.

II. Description of Related Art

The ever-growing wireless communications industry poses several challenges for radar systems. One serious challenge is that RF interference caused by communication systems operating out-of-band to the radar degrades the performance of the radar system. For example, out-of-band transmissions generated by base station transmitters are known to interfere with next generation weather radars as well as air traffic control radars.

Radar systems are further challenged by the potential new FCC regulations which are designed to ensure that every American has access to broadband capability. One aspect of these regulations is to free 500 megahertz of federal and nonfederal spectra for mobile and fixed wireless broadband usage. However, any radar currently operating in the affected frequency bands will be rendered useless unless the radar has the capability to mitigate in-band radio frequency interference and cooperate with the communication systems.

In order to obtain optimal radar performance from a radar system, one objective is to maximize the signal to interference plus noise ratio (SINR) of the radar signal. However, the presence of ambient/remote RF transmissions within the radar band degrades the radar system and thus the performance of the radar system.

One approach to increasing the SINR of the radar signal is to reduce the bandwidth of the radar signal in an effort to avoid the interfering radio frequency interference. By a sufficient reduction in the bandwidth for the radar signal, in many situations, the interfering radio frequency interference can be avoided.

However, a second objective for optimal performance of radar systems is to maximize the range resolution by minimizing the range resolution cell size. The size of the range resolution cell, however, is inversely proportional to the bandwidth. In other words, as the bandwidth reduces, the range resolution cell size increases.

Consequently, the two objectives for optimal performance of the radar system, namely (1) maximization of the signal to interference plus noise ratio for the radar signal and (2) minimization of the range resolution cell size, are each directly affected by the bandwidth of the radar transmission, but in an inverse fashion. In other words, increase of the bandwidth reduces the SINR for the radar signal but minimizes the range resolution cell size, and vice versa. As such, optimization of the radar system necessarily involves a balancing of these two objectives of the radar system for optimal performance.

SUMMARY OF THE PRESENT INVENTION

The present invention provides a method for optimizing radar transmissions by balancing the conflicting objectives of high SINR and minimization of the range resolution cell size.

In brief, the frequency range for the radar transmission is divided into a plurality of sub-bands. Each of the sub-bands forms a first tier of frequency sub-bands having a first bandwidth. Subsequent tiers of frequency sub-bands are then formed with each sub-band in each subsequent tier having a bandwidth equal to the bandwidth of the sub-bands in the first tier times the level of the tier for each combination of contiguous frequency sub-bands in the first tier.

The energy level is then measured for each of the sub-bands in all tiers and a range resolution is also determined for each sub-band. A sub-band is selected in the frequency range where the energy level plus the range resolution is maximum. Thereafter, a radar transmission is transmitted in the selected sub-band with a bandwidth and center frequency corresponding to the bandwidth and center frequency of the selected sub-band.

BRIEF DESCRIPTION OF THE DRAWING

A better understanding of the present invention will be had upon reference to the following detailed description when read in conjunction with the accompany drawing, wherein like reference characters refer to like parts throughout the several views, and in which.

DETAILED DESCRIPTION OF A PREFERRED EMBODIMENT OF THE INVENTION

Figure 1:
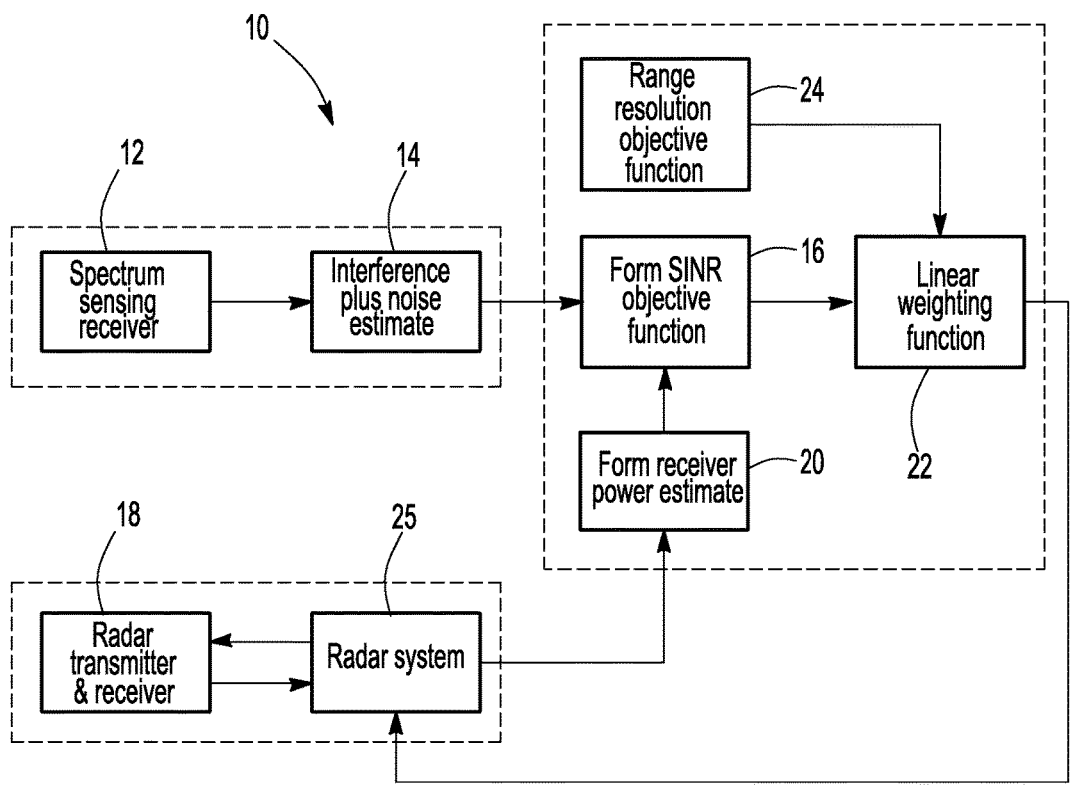
FIG. 1 is a block diagram of a radar system with passive sensing hardware for performing the method of the present invention.

With reference first to FIG. 1, a block diagram of a radar installation 10 for performing the method of the present invention is illustrated. The system 10 includes a spectrum sensing receiver 12 which generates power samples to an interference plus noise estimator 14 over the frequency range for the desired radar transmission. The interference plus noise estimator 14 generates a plurality of output signals for a plurality of sub-bands within the frequency range in a fashion that will be subsequently described in greater detail. The output from the estimator 14 is coupled as an input to a form signal to interference plus noise objective function block 16. This signal to interference plus noise objective function block 16 calculates a signal to interference plus noise ratio or energy level for each sub-band.

The installation 10 further includes a radar transmitter and receiver 18 which is conventional in construction. The radar 18 and 25 provides an output signal to a form receive power estimate 20 which is used by the form signal to interference plus noise objective function block 16 for the calculation of the energy level for each of the sub-bands in the frequency range. Furthermore, the signal to interference plus noise objective function block 16 provides an output signal to a linear weighting function 22 and, similarly, a range resolution objective function block 24 also provides an output signal to the weighting function 22. The weighting function 22, by proper selection of the weighting factor, provides a greater emphasis on either the energy level in each sub-band or the range resolution in each sub-band. The linear weighting function 22 also selects the optimal frequency sub-band with its center frequency as a result of the weighting function and provides an output signal to a radar system 25 indicative of the optimal bandwidth and center frequency. The radar system 25 then communicates with the radar transmitter and receiver 18 to generate the optimal radar signal. Furthermore, all of these functions are described in greater detail below.

Figure 3:
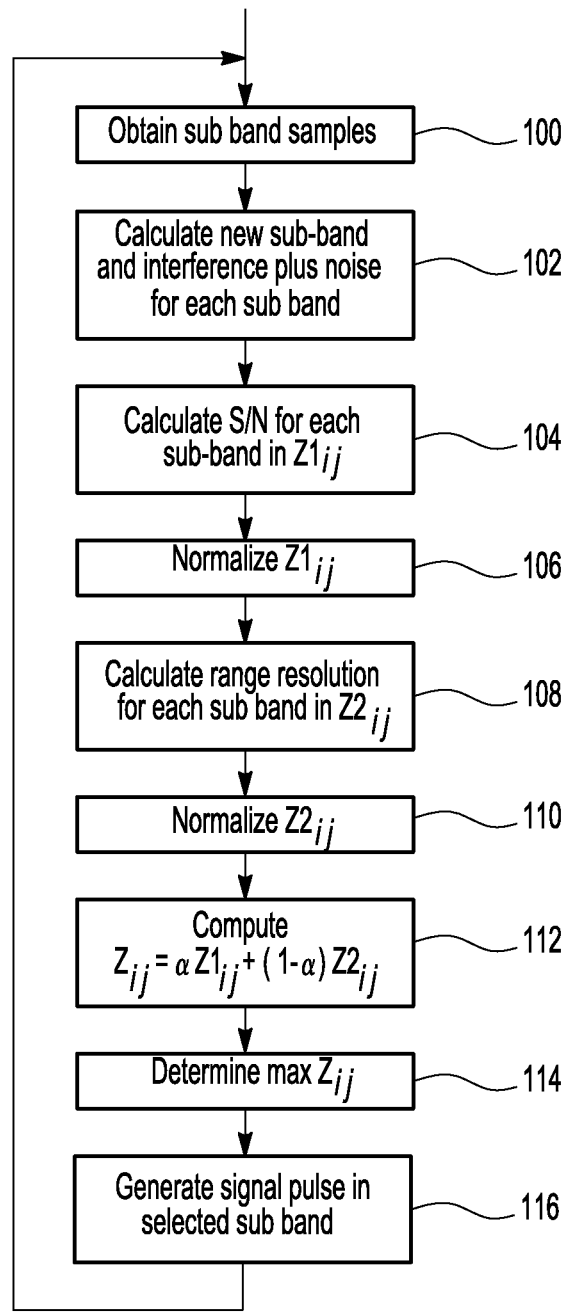
FIG. 3 is a flowchart illustrating the method of the present invention.

With reference now to FIGS. 1 and 3, at step 100 the spectrum sensing receiver 12 is used to passively monitor and obtain samples for fixed frequency bands over a frequency range for the radar system. An analog front end is preferably used to receive, process, and digitize the observed RF spectrum and generate a sequence of time domain samples. A fast Fourier transform then processes these samples to generate frequency domain samples corresponding to the frequencies and frequency resolutions within the frequency range.

At step 102 the interference plus noise estimator 14 next determines the interference plus noise, i.e. the energy, for all sub-band combinations within the frequency range. The sub-bands, furthermore, include a plurality of different bandwidths, each having their own center frequency.

Figure 2:
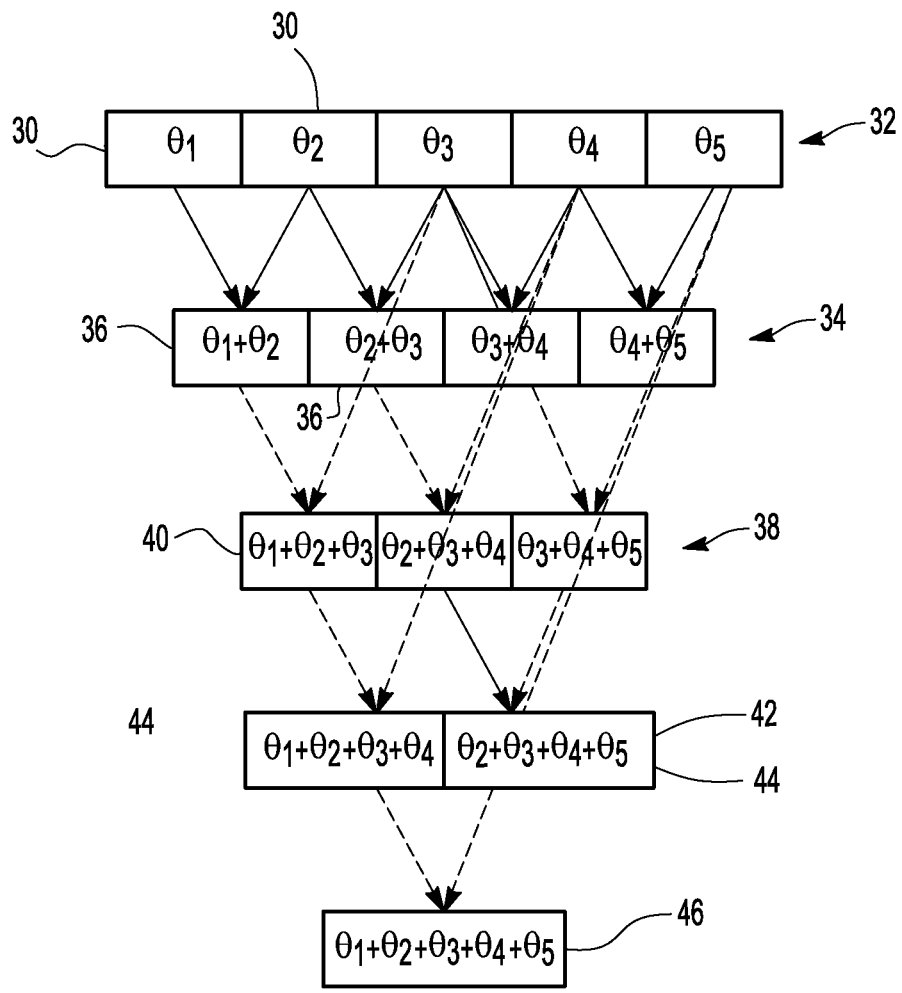
FIG. 2 is a chart illustrating the creation of different sub-bands in the frequency range.

With reference now to FIG. 2, one example of dividing a frequency range into sub-bands is illustrated utilizing a variation of Pascal's triangle. As shown, the entire frequency range for the radar system is first divided into a plurality of sub-bands 30 which form a first tier 32 of sub-bands. The sub-bands 30 in the first tier 32 each have an equal bandwidth, but different center frequencies.

A second tier 34 of sub-bands 36 is then formed by combining the number of the tier, i.e. two, times the sub-bands 30 in the first tier 32 for each contiguous combination of sub-bands. Consequently, assuming that the first tier 32 is divided into 4 sub-bands, the first sub-band 36 in the second tier 34 includes $\theta_1+\theta_2$. $\theta_i$ is the energy in the ith sub-band. The second sub-band in the second tier 34 includes $\theta_2+\theta_3$, and so forth through the entire frequency range.

Similarly, a third tier 38 includes three sub-bands 40 each having a bandwidth equal to three of the sub-bands 30 in the first tier 32. Likewise, a fourth tier 42 contains two sub-bands 44, each having a bandwidth equal to four times the bandwidth of the sub-bands 30 in the first tier 32 while a final or fifth tier 46 includes the entire bandwidth of the frequency range.

Consequently, as can be seen from FIGS. 2 and 3, the entire frequency range for this example has been divided into fifteen sub-bands which vary in bandwidth depending upon the level of the tier. Each sub-band has its own unique center frequency. The average power of sub-bands is then determined by dividing the entire power in the sub-band by the number of bandwidths 30 in the first tier 30. For example, for the third tier 38, the power in each of the sub-bands 40 is divided by 3, i.e. the bandwidth of the sub-bands 40 divided by the bandwidth of the sub-bands 30 in the first tier 32.

The example of FIG. 2 can be expanded from 5 to n levels using the following recursive formula:

$$P_{i,j} = \begin{cases} \theta_j, & i=1, j=1,\ldots n \\ P_{1,j} + P_{1,j+1}, & i=2, j=1,\ldots n-1 \\ P_{i-1,j} + P_{1,j} & i=3,\ldots n, j=1,\ldots n-i+1 \end{cases} \quad (1)$$

where i≤n represents the level number and j≤n represents the element location for a given Level i. The bandwidth for any level, i.e. the sub-band size, is determined as $$\beta_{i,j} = iF_r, \quad (2)$$

for i={1, . . . n}, j={1, . . . n−i+1}, and $\beta_{i,j} \in B$. The center frequency of any element location for a given level is defined as $$f_c = (f_j + f_{j+i+1})/2, \quad (3)$$

for i=({1, . . . n} and j={1, . . . n−i+1}. The computational complexity of (1) requires $(n^2-n)/2$ summations.

In this development it is necessary to consider the average power within each sub-band and not the total power as calculated by (I). This is because the noise power (in the noise floor) accumulates by summing the total power and masks low power interference. The average interference plus noise power is defined as $$\hat{P}_{i,j} = P_{i,j}/i, \quad (4)$$

where the number of elements in (4) is determined as:

$$\bar{n} = \sum_{k=1}^{n}(n-k+1) = (n^2+n)/2 \quad (5)$$

and represents the total number of sub-bands available. The computational complexity of (4) corresponds to $\bar{n}-n$ divisions.

Referring again to FIGS. 1 and 3, at step 104 the signal to interference plus noise ratio or power for each of the sub-bands within the frequency range is then calculated using the radar range equation for a linear chirp signal from the radar 18 and 25. The total power for each sub-band $Z1_{i,j}$ is calculated as follows:

$$Z1_{i,j} = Pr_{i,j}/\hat{P}_{i,j},$$

where $$Pr_{i,j} = \frac{P_t G^2 \lambda^2 \sigma}{(4\pi)^3 R^4} \tau \beta_{i,j},$$

$P_t$ is the peak transmit power of the radar, G is the antenna gain (assuming the same gain for transmission and reception), σ is the target radar cross section (RCS), λ is the wavelength of the carrier frequency, R is the range to target, τ is the radar pulse width, and $\tau\beta_{i,j}$ is the time-bandwidth (TB) product.

Consequently, at the conclusion of the calculation of the array $Z1_{i,j}$ contains all of the energy level values for each of the sub-bands in the overall frequency range or, in the example illustrated in FIG. 2, fifteen different sub-bands. Each sub-band, of course, has its own center frequency. Furthermore, the entire array $Z1_{i,j}$ is also preferably normalized between 0 and 1 at step 106.

Consequently, the array $Z1_{i,j}$ contains values which represent the first of the two objectives of the radar system, i.e. maximization of the SINR or energy in each sub-band.

However, in order to achieve the optimal radar transmission, the range resolution objective function 24 (FIG. 1) must provide an optimal range of resolution for each of the sub-bands.

The standard definition of range resolution cell size is c/2B where c equals the speed of light in free space and B equals the bandwidth for the individual sub-bands. Since minimization of the cell size is desired for optimal performance, maximization of the inverse function, i.e. 2 times bandwidth divided by the speed of light, provides the same optimal values for the range resolution.

Consequently, at step 108 a second array $Z2_{i,j}$ containing range resolution for each sub-band is computed as follows $$Z2_{i,j}=2\beta_{i,j}/c$$

by the range resolution objective function 24 (FIG. 1). The array $Z2_{i,j}$ is then normalized at step 110.

In order to select the optimal sub-band with its center frequency, it is then necessary to select the maximum of the addition of $Z1_{i,j}+Z2_{i,j}$ for each of the sub-bands in the frequency range to form a new array $Z_{i,j}$. The new array is calculated at step 112 as follows:

$$Z_{i,j}=\alpha Z1_{i,j}+(1-\alpha)Z2_{i,j}$$

where $0 \leq \alpha \leq 1$ is a user-defined weighting parameter. The user selected weighting parameter $\alpha$ allows the user to assign more weight to the bandwidth, or the range resolution, as desired. If $\alpha$ equals 0.5, an equal weight is applied to both the power level as well as the range resolution by the linear weighting function 22 in FIG. 1.

Once the array $Z_{i,j}$ has been formed, it is merely necessary at step 114 to identify the array entry with the maximum value which corresponds with the optimal sub-band together with its center frequency. This signal is provided by the weighting function 22 (FIG. 1) to the radar system 24 which controls the bandwidth and center frequency of the radar transmission and receiver. The radar system 24 sets the bandwidth and center frequency to the array entry in the array $Z_{i,j}$ as the maximum amount. The radar system 25 then generates a radar pulse through the radar transmitter/receiver 18 at step 116. The above process is then reiterated repeatedly for successive radar transmissions.

From the foregoing, it can be seen that the present invention provides a unique method for optimizing both the bandwidth and center frequency of a radar transmission which optimizes both the SINR or energy level as well as the conflicting objective of range resolution to achieve optimal radar performance. Furthermore, the weight applied to each of these two objectives may be adjusted as desired by the user.

Even though the present invention has been described for use with a radar system, it will be understood that it may be also applied to other RF transmissions in which different conflicting objectives than energy level and range resolution are calculated.

Having described my invention, however, many modifications thereto will become apparent to those skilled in the art to which it pertains without deviation from the spirit of the invention as defined by the scope of the appended claims.

We claim:

1. A method for optimizing bandwidth selection of a radar transmission in a frequency range comprising the steps of:

subdividing said frequency bandwidth into plurality of equal width sub-bands, each sub-band forming a first tier of frequency sub-bands of a first bandwidth, forming subsequent levels of tiers of frequency sub-bands, each sub-band in each subsequent tier having a bandwidth equal to the bandwidth of the sub-bands in the preceding tier times the level of the tier for every combination of contiguous frequency sub-bands in the first tier measuring the signal to interference plus noise ratio level in each of said sub-bands and dividing the signal to interference plus noise ratio by the tier level, determining a range resolution for each sub-band, selecting a sub-band in said frequency range where the signal to interference plus noise ratio plus the range resolution is maximum, and thereafter transmitting the radar transmission in said selected sub-band and with a bandwidth corresponding to the bandwidth and center frequency of said selected sub-band.

2. The method as defined in claim 1 wherein said selecting step comprises the step of normalizing said signal to interference plus noise ratio and said range resolution for each sub-band.

3. The method as defined in claim 2 wherein said selecting step further comprises the step of multiplying said signal to interference plus noise ratio and said range resolution by a weighing factor.

4. Apparatus for optimizing bandwidth selection of a radar transmission in a frequency range comprising:

means for subdividing said frequency bandwidth into a plurality of equal width sub-bands, each sub-band forming a first tier of frequency sub-bands of a first bandwidth, means for forming subsequent levels of tiers of frequency sub-bands, each sub-band in each subsequent tier having a bandwidth equal to the bandwidth of the sub-bands in the preceding tier times the level of the tier for every combination of contiguous frequency sub-bands in the first tier means for measuring a signal to interference plus noise ratio in each of said sub-bands further comprising the step of dividing the signal to interference plus noise ratio by the tier level, means for determining a range resolution for each sub-band, means for selecting a sub-band in said frequency range where the signal to interference plus noise ratio plus the range resolution is maximum, and means for thereafter transmitting the radar transmission in said selected sub-band and with a bandwidth corresponding to the bandwidth and center frequency of said selected sub-band.

5. The apparatus as defined in claim 4 wherein said selecting means comprises means for normalizing said signal to interference plus noise ratio and said range resolution for each sub-band.

6. The apparatus as defined in claim 5 wherein said selecting means further comprises means for multiplying said signal to interference plus noise ratio and said range resolution by a weighing factor.

* * * * *